(12) United States Patent
Gulati et al.

(10) Patent No.: US 10,855,328 B1
(45) Date of Patent: Dec. 1, 2020

(54) INTERFERENCE SUPPRESSION FOR MULTI-RADAR COEXISTENCE

(71) Applicant: QUALCOMM Incorporated, San Diego, CA (US)

(72) Inventors: Kapil Gulati, Hillsborough, NJ (US); Junyi Li, Chester, NJ (US); Jayakrishnan Unnikrishnan, Jersey City, NJ (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/503,011

(22) Filed: Jul. 3, 2019

(51) Int. Cl.
| | |
|---|---|
| *H04B 1/711* | (2011.01) |
| *H04B 1/7103* | (2011.01) |
| *H04L 27/26* | (2006.01) |
| *H04B 7/0456* | (2017.01) |
| *H04J 13/00* | (2011.01) |
| *H04B 17/354* | (2015.01) |
| *H04B 1/69* | (2011.01) |

(52) U.S. Cl.
CPC ........... *H04B 1/711* (2013.01); *H04B 1/7103* (2013.01); *H04B 7/0478* (2013.01); *H04B 17/354* (2015.01); *H04J 13/0062* (2013.01); *H04J 13/0077* (2013.01); *H04L 27/2628* (2013.01); *H04B 2001/6912* (2013.01)

(58) Field of Classification Search
CPC .... H04B 1/711; H04B 1/7103; H04B 17/354; H04B 7/0478; H04B 2001/6912; H04J 13/0062

USPC ........................................................ 375/362
See application file for complete search history.

(56) References Cited

U.S. PATENT DOCUMENTS

| | | | |
|---|---|---|---|
| 6,321,602 B1* | 11/2001 | Ben-Romdhane | F16C 19/52 340/679 |
| 10,082,562 B1* | 9/2018 | Abari | G01S 13/931 |
| 2006/0222098 A1* | 10/2006 | Sedarat | H04L 5/0046 375/260 |
| 2017/0219689 A1* | 8/2017 | Hung | G01S 13/343 |
| 2019/0086528 A1* | 3/2019 | Steiner | F04D 27/004 |
| 2019/0219683 A1* | 7/2019 | Fang | G01S 7/023 |
| 2020/0132825 A1* | 4/2020 | Jungmaier | G01S 7/023 |

\* cited by examiner

*Primary Examiner* — Kevin M Burd
(74) *Attorney, Agent, or Firm* — Brian Momeyer; Thien T. Nguyen

(57) ABSTRACT

Methods, systems, computer-readable media, and apparatuses for transmitting and receiving radar signals from a radar source while minimizing interference with other radar sources are presented. A transmit signal comprising a first chirp sequence is generated according to a set of waveform parameters, with least one waveform parameter being varied for one or more chirps in the first chirp sequence. Additionally, each chirp of the first chirp sequence can be phase-modulated. A receive signal comprising a second chirp sequence and corresponding to the transmit signal reflected off an object in a surrounding environment is then sampled to determine one or more attributes of the object. In some embodiments, the attributes include distance and speed values calculated using Discrete Fourier Transforms (DFTs). Other attributes that can be calculated from the receive signal include azimuth angle and elevation angle.

19 Claims, 12 Drawing Sheets

INTERFERENCE SUPPRESSION FOR MULTI-RADAR COEXISTENCE

BACKGROUND

Aspects of the present disclosure relate to transmission and detection of signals from a radar source in the presence of an interfering radar source.

Radar signals are often used for detecting the presence of objects in a surrounding environment. For example, motor vehicles are sometimes equipped with a radar unit that transmits a radar signal in order to detect a corresponding signal reflected off another object such as a nearby vehicle. Detection can be difficult if there are other radar sources transmitting signals that interfere with the reflected signal.

BRIEF SUMMARY

Various illustrative embodiments are described that enable a radar source to coexist with other radar sources. In particular, techniques are described for generating a radar signal in a way that minimizes interference between the radar source and any additional radar sources that may exist in the surrounding environment. Techniques are also described for processing a received radar signal in such a way that interference from another radar source is readily distinguishable from reflected signals. In certain embodiments, a radar system may include one or more hardware processors or circuitry configured to generate a radar signal based on one or more waveform parameters selected to minimize interference. The radar signal can be a frequency-modulated continuous-wave (FMCW). However, the techniques described herein can be applied to other types of radar signals, e.g., phase-modulated continuous-wave (PMCW) radar.

In certain embodiments, a transmitted radar signal comprises a sequence of chirps, with waveform parameters being varied on a per chirp basis based on a set of parameter patterns that have been configured for suppressing interference and/or for shaping interference in a way that makes interference signals readily distinguishable from reflected signals during receiver processing. The set of parameter patterns can be selected from a codebook comprising multiple sets of parameter patterns that have been configured for high auto-correlation and low mutual correlation (also known as cross-correlation).

In certain embodiments, a transmitted radar signal is generated by performing phase modulation on each chirp, based on an additional set of parameters corresponding to a phase code. The addition of phase modulation reduces the likelihood that the transmitted radar signal is generated using the exact same parameters as an interference source.

In certain embodiments, the waveform parameters for a radar signal are varied in response to a determination that a previously transmitted portion of the radar signal (e.g., a previous chirp sequence) was subject to interference. Interference may be detected by attempting to perform object detection based on a first set of waveform parameters that are different from a second set of waveform parameters used for the previously transmitted portion of the radar signal. If the attempt is successful, this indicates that an interference source using the first set of waveform parameters is likely contributing to the received radar signal. Accordingly, the first set of waveform parameters can be ruled out for use with a subsequently transmitted portion of the radar signal. For example, the first set of waveform parameters can be kept from being used for a certain time period.

In certain embodiments, a method, one or more non-transitory computer-readable media storing instructions executable by one or more processors to cause the one or more processors to perform the method, and a radar system configured to perform the method are provided. The method includes generating a transmit signal comprising a first chirp sequence. Each chirp in the first chirp sequence is generated according to a set of waveform parameters. The method further includes varying at least one waveform parameter in the set of waveform parameters for one or more chirps in the first chirp sequence; and receiving a receive signal comprising a second chirp sequence. The receive signal corresponds to the transmit signal reflected off an object in a surrounding environment and is sampled. The method further includes determining, using the sampled receive signal, one or more attributes of the object.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
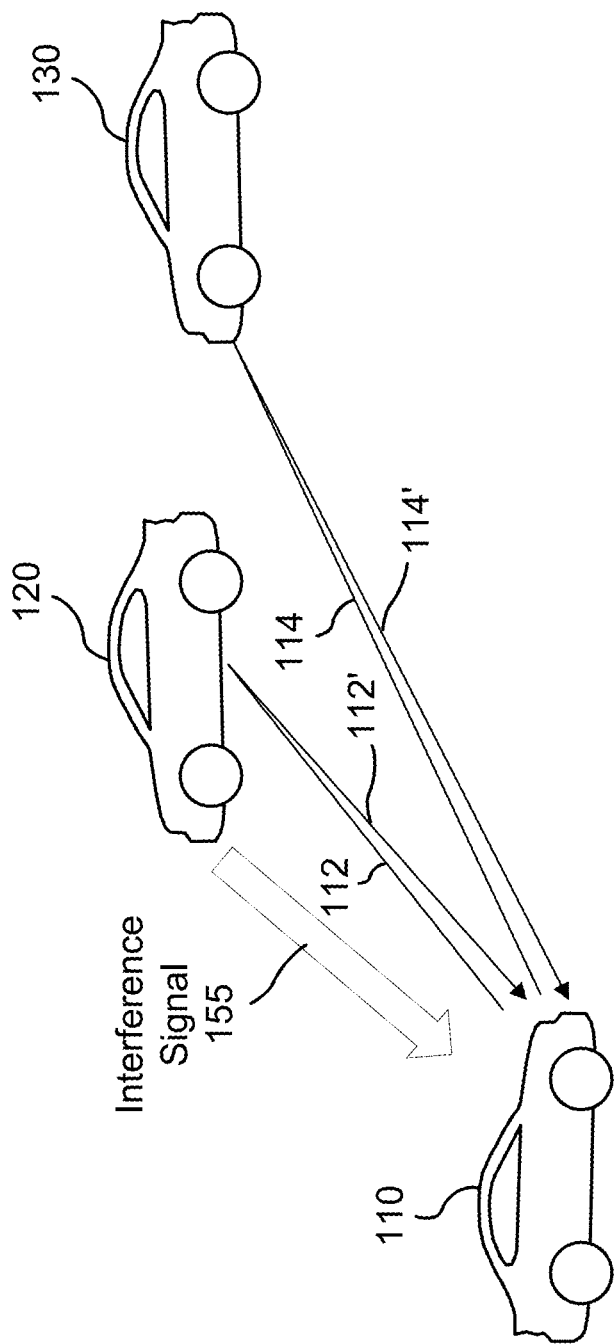
FIG. 1 illustrates an example scenario that can produce radar interference.

Several illustrative embodiments will now be described with respect to the accompanying drawings. While particular embodiments, in which one or more aspects of the disclosure may be implemented, are described below, other embodiments may be used and various modifications may be made without departing from the scope of the present disclosure or the spirit of the appended claims.

Various illustrative embodiments are described that enable a radar source to coexist with other radar sources. In particular, techniques are described for generating a radar signal in a way that minimizes interference between the radar source and any additional radar sources that may exist in the surrounding environment. Techniques are also described for processing a received radar signal in such a way that interference from another radar source is readily distinguishable from reflected signals. In certain embodiments, a radar system may include one or more hardware processors or circuitry configured to generate a radar signal based on one or more waveform parameters selected to minimize interference. The radar signal can be a frequency-modulated continuous-wave (FMCW). However, the techniques described herein can be applied to other types of radar signals.

In certain embodiments, a transmitted radar signal comprises a sequence of chirps, with waveform parameters being varied on a per chirp basis based on a set of parameter patterns that have been configured for suppressing interference and/or for shaping interference in a way that makes interference signals readily distinguishable from reflected signals during receiver processing. The set of parameter patterns can be selected from a codebook comprising multiple sets of parameter patterns that have been configured for high auto-correlation and low mutual correlation.

In certain embodiments, a transmitted radar signal is generated by performing phase modulation on each chirp, based on an additional set of parameters corresponding to a phase code. The addition of phase modulation reduces the likelihood that the transmitted radar signal is generated using the exact same parameters as an interference source.

In certain embodiments, the waveform parameters for a radar signal are varied in response to a determination that a previously transmitted portion of the radar signal (e.g., a previous chirp sequence) was subject to interference. Interference may be detected by attempting to perform object detection based on a first set of waveform parameters that are different from a second set of waveform parameters used for the previously transmitted portion of the radar signal. If the attempt is successful, this indicates that an interference source using the first set of waveform parameters is likely contributing to the received radar signal. Accordingly, the first set of waveform parameters can be ruled out for use with a subsequently transmitted portion of the radar signal. For example, the first set of waveform parameters can be kept from being used for a certain time period.

As used herein, the term "codeword" or "parameter pattern" refers to data (e.g., a set of digital values) indicating a particular combination of waveform parameters for a transmitted radar signal. Codewords can be used to form at least a portion of the transmitted radar signal. The term "codebook" refers to a plurality of predefined codewords that are selectable for use in generating a radar signal. As explained below, codewords can be selected to determine the characteristics of a given chirp in a transmitted waveform. By selecting different codewords, the transmitted waveform can be varied on a per chirp basis. The terms "radar signal" and "radar waveform" are used herein interchangeably since radar signals are transmitted as waves, e.g., frequency-modulated radio waves.

FIG. 1 illustrates an example scenario that can produce radar interference. As shown in FIG. 1, a first vehicle 110 transmits a radar signal that is reflected off a second vehicle 120 and a third vehicle 130. Both vehicles 120 and 130 are located within a transmission range of vehicle 110. The vehicle 130 is farther away from vehicle 110 than the vehicle 120. Vehicle 120 may receive a copy 112 of the radar signal transmitted by vehicle 110 to reflect back a corresponding signal 112'. Similarly, vehicle 130 may receive a copy 114 of the radar signal transmitted by vehicle 110 to reflect back a corresponding signal 114'. Additionally, the vehicle 120 transmits its own radar signal 155, which acts as an interference signal.

The interference signal 155 is a direct signal that interferes with the reflected signals 112' and 114'. Generally, direct signals are much stronger than reflected signals. For example, if the received power of the signals 155, 112', and 114' were measured (e.g., in units of decibel-milliwatts) as a function of distance, the measurements may indicate that the interference signal 155 exhibits power of two exponential decay, whereas the reflected signals 112' and 114' exhibit power of four exponential decay. Thus, the signal-to-interference (SIR) ratio of the reflected signals 112' and 114' rapidly decreases with increasing distance from the receiver (i.e., vehicle 110). Since the interference signal 155 is relatively high power compared to the reflected signals 112' and 114', the interference signal 155 has a greater contribution to a received signal (e.g., the combination of interference signal 155 and reflected signals 112' and 114'), thereby preventing the reflected signals 112' and 114' from being detected at vehicle 110.

Additionally, interference signal 155 may cause the radar receiver in vehicle 110 to falsely identify the interference signal 155 as being an actual reflection. The distance to an object can be measured based on round-trip time, e.g., the time from when a radar signal is transmitted to the time a corresponding reflected signal is received back at the radar source. Since the interference signal 155 is directly transmitted, the interference signal 155 may be erroneously detected as corresponding to a target appearing at half the actual distance of vehicle 120. Thus, the interference signal 155 may result in detection of a "ghost" target.

Techniques for minimizing interference to enable multi-radar coexistence (e.g., co-existence of the radar sources corresponding vehicles 110 and 120 in FIG. 1) will now be described.

Figure 2:
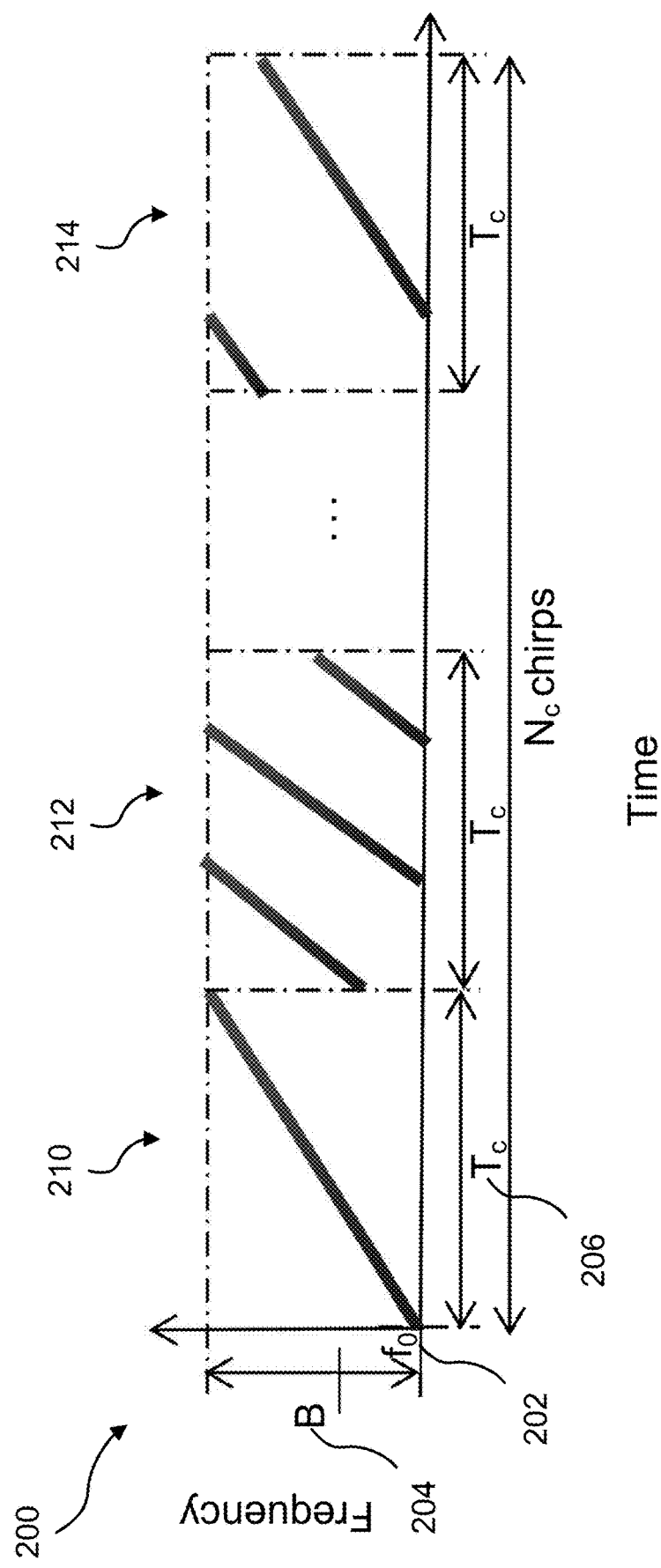
FIG. 2 illustrates an example transmitted waveform in accordance with certain embodiments

FIG. 2 illustrates an example transmitted waveform 200 in accordance with certain embodiments. The waveform 200 is an FMCW waveform comprising a sequence of chirps, each chirp being of duration "$T_c$" 206, and with the total number of chirps in the sequence being "$N_c$." A chirp is a signal transmitted over a specific time period (in this example, $T_c$), where the frequency of the signal increases or decreases during the time period. FIG. 2 depicts the waveform 200 as a function of frequency versus time. If the waveform 200 were depicted as a function of amplitude versus time, the waveform 200 would appear as a sinusoidal signal that oscillates at varying speeds. The first chirp 210 has a frequency offset "$f_0$" 202 and a frequency bandwidth "B" 204. As depicted in FIG. 2, the waveform is varied on a per chirp basis, with a first chirp 210 ramping linearly in frequency from $f_0$ to $B+f_0$. The next chirp 212 after chirp 210 ramps faster and has a slope that is approximately double that of the chirp 210. Consequently, the frequencies of chirp 212 wrap around the frequency range $[f_0, B+f_0]$ during the time period $T_c$. The slope of each chirp can be set according to a slope parameter. Additionally, chirp 212 has a frequency offset greater than $f_0$. As explained later, the slope and/or frequency offset can be varied on a per chirp basis. It should be noted that varying waveforms on a per chirp basis does not exclude the same waveform parameters from being reused during a sequence of chirps. For example, as shown in FIG. 2, the last chirp 214 has the same slope as the first chirp 210, but a different frequency offset. In some embodiments, a chirp sequence may include identical chirps, i.e., the same set of waveform parameters for a first chirp could be reused for a second chirp in the same chirp sequence, so long as at least one waveform parameter is varied for at least one of the chirps in the sequence.

Figure 3:
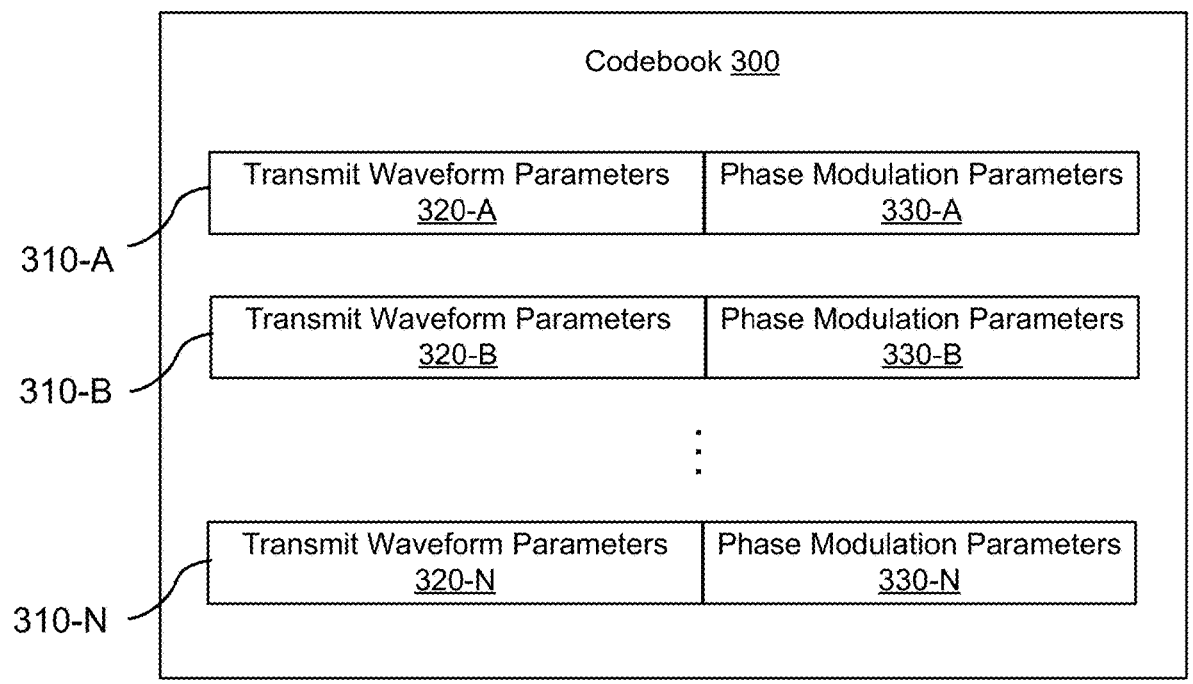
FIG. 3 is a simplified illustration of a codebook in accordance with certain embodiments.

FIG. 3 is a simplified illustration of a codebook 300 in accordance with certain embodiments. The codebook 300 comprises a set of codewords 310, i.e., parameter patterns. Each codeword 310 differs from any other codeword 310 in the codebook 300 by at least one parameter. As depicted in FIG. 3, each codeword 310 may comprise transmit waveform parameters 320 and phase modulation parameters 330 to be used in conjunction with the transmit waveform parameters 320. The transmit waveform parameters 320 may comprise, for example slope and frequency offset values that form a "base" set of parameters for the transmit waveform. Phase codes are described later and may comprise slope and frequency offset values for a phase signal with which the transmit waveform is modulated.

In FIG. 3, each codeword 310 is depicted as comprising transmit waveform parameters paired with phase modulation parameters. In an alternative embodiment, transmit waveform parameters 320 and phase modulation parameters 330 may be selected independently. For example, a codeword may be formed by selecting waveform parameters, selecting phase modulation parameters, and combining the selected waveform parameters with the selected phase modulation parameters.

The transmit waveform parameters 320 can be configured for high autocorrelation and low mutual correlation. This means that the statistical correlation between a waveform generated using any particular set of transmit waveform parameters 320 and a delayed version of the same waveform (e.g., the waveform as received back at the radar source after being reflected off an object) will indicate a relatively high degree of similarity between the two waveforms. In contrast, the correlation between a waveform generated using a first set of waveform parameters (e.g., transmit waveform parameters 310-A) from the codebook 300 and a waveform generated using a second set of waveform parameters (e.g., transmit waveform parameters 310-B) from the codebook 300 will indicate a relatively low degree of similarity. As explained later, such correlation properties may be achieved by selecting waveform parameters that produce a waveform characterized by a Zadoff-Chu (ZC) sequence. However, parameters that do not produce exact ZC sequences can also be used.

Figure 4:
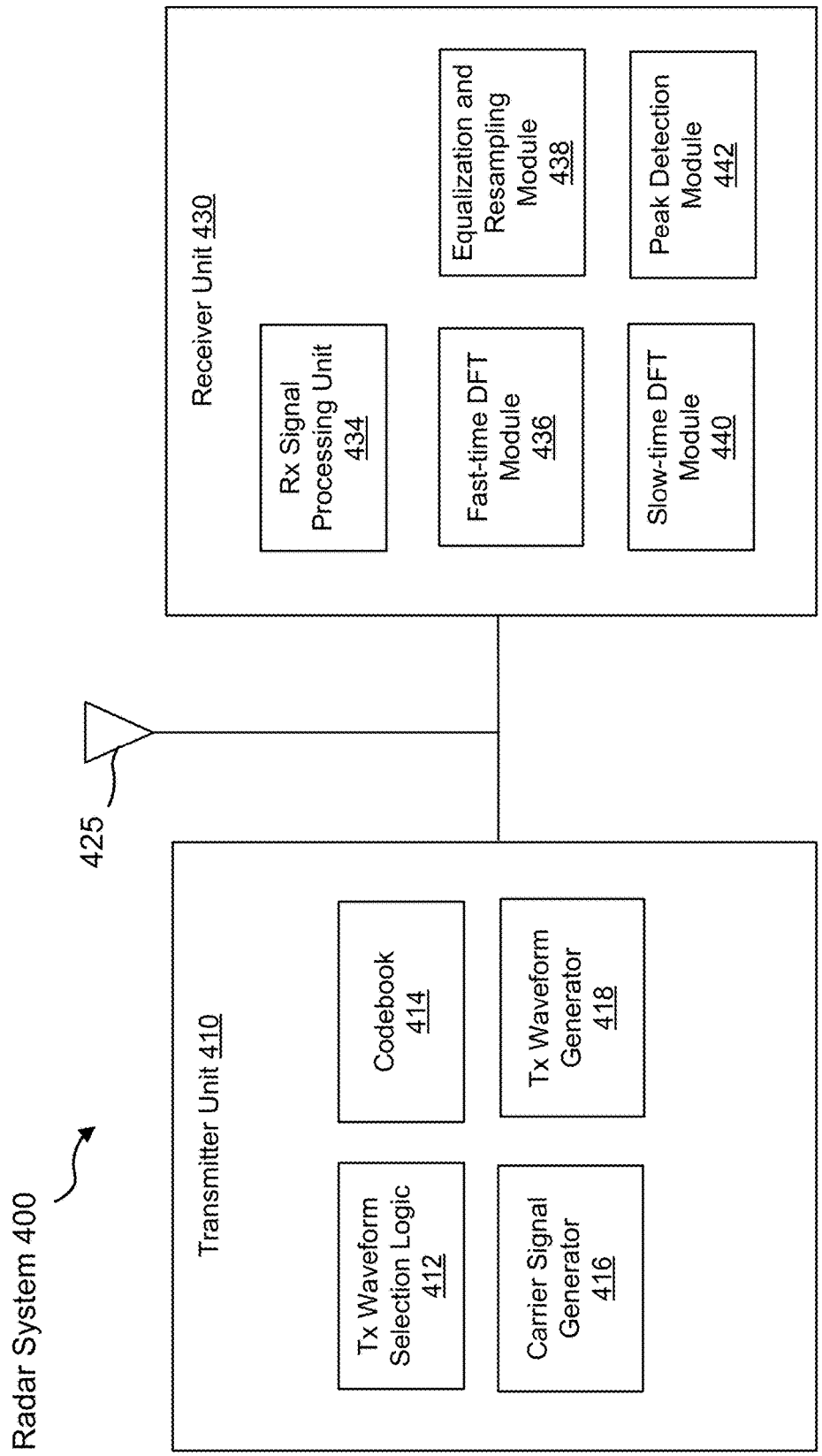
FIG. 4 is a simplified block diagram of an example radar system in accordance with certain embodiments.

FIG. 4 is a simplified block diagram of an example radar system 400 in accordance with certain embodiments. The radar system 400 includes a transmitter unit 410 and a receiver unit 430, both of which share access to an antenna 425. In an alternative embodiment, the transmitter unit 410 and the receiver unit 430 may include separate antennas, one for transmitting radar signals and one for receiving radar signals. The depicted block elements of transmitter unit 410 and receiver unit 430 may be implemented in hardware, software, or a combination thereof. The transmitter unit 410 and the receiver unit 430 may share components besides antenna 425. For example, although not depicted at the block level, hardware components such as one or more processors and one or more memory or storage elements may be shared by transmitter unit 410 and receiver unit 430. In some embodiments, the functionality described with respect to transmitter unit 410 and receiver unit 430 may be implemented using a single processing unit (e.g., a microprocessor comprising one or more individual processing cores).

The transmitter unit 410 may include transmit (Tx) waveform selection logic 412, a codebook 414, a carrier signal generator 416, and a Tx waveform generator 418. The transmitter unit 410 may be communicatively coupled to the receiver unit 430, e.g., via one or more communication buses (not shown).

The Tx waveform selection logic 412 is configured to select codewords from codebook 414 to generate a radar signal for transmission through antenna 425. The selected codewords may be communicated to the receiver unit 430 to enable processing of a radar signal received via antenna 425, e.g., a received radar signal comprising one or more reflected versions of the transmitted radar signal as well as one or more interference signals. In some embodiments, a different codeword may be selected for each chirp. In other embodiments, a codeword may be reused for a certain number of successive chirps and then switched out for a different codeword.

The codebook 414 may correspond to codebook 300 in FIG. 3 and includes multiple codewords for generating transmitted waveforms. As discussed earlier in connection with FIG. 3, the codewords may include parameters that determine the characteristics of a given chirp and, optionally, phase modulation parameters.

The carrier signal generator 416 is configured to generate a carrier signal by which a transmit waveform is modulated. For example, if the transmit waveform is an FMCW waveform, the carrier signal may be generated as a periodic signal having a carrier frequency "$f_c$."

The transmit waveform generator 418 is configured to generate a radar signal for transmission based on the codewords selected by Tx waveform selection logic 412. The transmit waveform generator 418 may include a digital-to-analog converter, a transmit buffer, a frequency modulation circuit, and/or other circuitry commonly used for generating radar signals. Prior to transmission, the radar signal may be represented digitally as a function of the variables "m" and "n," where m is the sequence number of the current chirp and n is the nth sample of that chirp. Thus, a transmit waveform x[m, n] can be represented in the digital domain as a function of m and n. The transmit waveform is transmitted as an analog signal x(t) that varies as a function of time.

The receiver unit 430 may include a receive (Rx) signal processing unit 434, a fast-time Discrete Fourier Transform (DFT) module 436, an equalization and resampling module 438, a slow-time DFT module 440, and a peak detection module 442.

The Rx signal processing unit 434 is configured to receive a radar signal from antenna 425 and apply signal processing to condition the received radar signal for subsequent processing, e.g., in preparation for object detection by peak detection module 442. Rx signal processing unit 434 may receive the radar signal as an analog signal y(t) in the time domain and convert the received radar signal into a corresponding signal y[m, n] in the digital domain. The Rx signal processing unit 434 is further configured to select waveform parameters for use in processing of the received radar signal. In particular, Rx signal processing unit 434 may identify the codewords which were used for generating the transmitted radar signal. The codewords may be communicated from Tx waveform selection logic 412 to Rx signal processing unit 434, e.g., directly communicated or through storage of previously used codewords in a shared memory location.

The fast-time DFT module 436 is configured to apply a fast-time DFT to the digital form of the received radar signal. The fast-time DFT can be implemented using a Fast Fourier Transform (FFT) algorithm and may be applied to generate a separate set of Fourier Transform values for each individual chirp of the received radar signal. The output of the fast-time DFT may comprise, for any particular chirp, one or more amplitude values as a function of frequency. The frequency domain can be divided into a set of bins representing delay. The bins can be graphically represented as a one-dimensional array in the delay domain, where each bin is located at a different delay index. Amplitudes that are above a certain threshold may be considered peaks. As explained later, the bin location of peaks can be used to determine the speed and distance of targets, as well as for distinguishing reflected signals from interference signals.

The equalization and resampling module 438 is configured to condition the outputs of the fast-time DFT module 436 in order to compensate for the effects of varying waveform parameters. The equalization and resampling enable peaks to be coherently combined with each other during processing by slow-time DFT module 440. Equalization and resampling are described below in connection with FIG. 7.

The slow-time DFT module 440 is configured to apply a second DFT upon the outputs of the fast-time DFT module 436, after the fast-time DFT outputs have been equalized and resampled. Slow-time DFTs are more time consuming and processing intensive than fast-time DFTs. While it is not strictly necessary for the second DFT to be a slow-time DFT, the use of slow-time DFTs generally provides more detailed information about the frequency characteristics of input data. The first DFT and the second DFT together can be considered a two-dimensional DFT because the second DFT adds another dimension to the results of the first DFT. The output of the second DFT can be represented graphically as a two-dimensional array of bins, where the first dimension is the delay dimension of the fast-time DFT and the second dimension represents Doppler shift. Delay corresponds to the distance of a target. Doppler shift corresponds to the speed of a target. Thus, the speed and distance of a target can be calculated based on the location of a corresponding peak in the two-dimensional array.

The peak detection module 442 is configured to identify peaks in the output of the slow-time DFT module 440 and to determine the speed and distance of an object based on the bin location of a identified peak. In some embodiments, peak detection module 242 may execute a constant false alarm rate (CFAR) algorithm to rule out false peaks.

Figure 5:
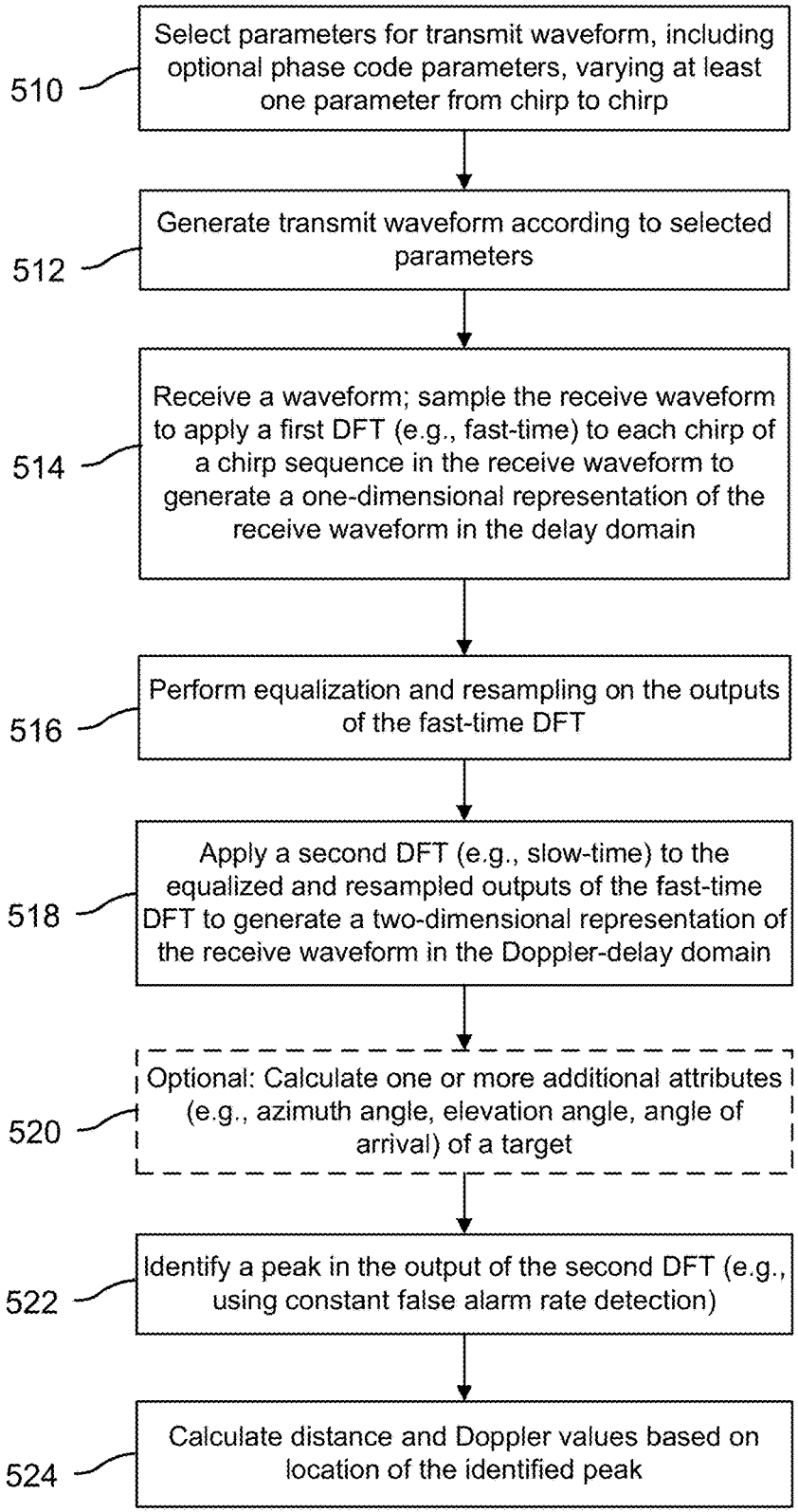
FIG. 5 is a simplified flowchart of a method for generating and receiving radar signals in accordance with certain embodiments.

FIG. 5 is a simplified flowchart of a method 500 for generating and receiving radar signals in accordance with certain embodiments. The processing depicted in FIG. 5 can be performed by a radar system, e.g., the radar system 400 of FIG. 4. At step 510, parameters are selected for a transmit waveform, e.g., based on a codeword from a codebook. In certain embodiments, the parameters may include parameters that determine the shape of an FMCW waveform and additional parameters that determine the shape of a phase signal with which the waveform is modulated. Without considering the addition of phase modulation, and assuming that all chirps are formed using the same set of parameters (e.g., the same slope and offset), the transmit waveform can be expressed in the time domain as:

$$x(t)=\exp(-j2\pi f_c t)\exp(-j\pi(\beta t+f_0)t) \quad (1)$$

where $f_c$ is the carrier frequency, $f_0$ is the frequency offset, t is time, and $\beta$ is the slope. In Equation 1, the transmit waveform x(t) is represented by two exponential terms. The first exponential is a function of the carrier frequency $f_c$ and corresponds to the modulating waveform, i.e., the carrier signal. The second exponential is a function of the frequency offset $f_0$ and the slope $\beta$ and corresponds to the transmit waveform prior to modulation.

If the parameters comprise slope and frequency offset values chosen for each chirp individually, then the parameters for the $m^{th}$ chirp can be expressed as follows:

$$(\beta^{(m)}, f_0^{(m)}) = \left(u^{(m)}\frac{B}{T_c}, u^{(m)}\frac{(1+2q^{(m)})}{T_c}\right) \quad (2)$$

The right side of Equation 2 corresponds to the slope and offset parameters converted into parameters u and q of a Zadoff-Chu sequence, where u varies from 0 to the length of the ZC sequence (in this example, the length is equal to $BT_c$) and q can be any integer value. As seen in Equation 2, u depends on the slope and q depends on the offset. Therefore, u and q respectively represent slope and offset.

Thus, the transmit waveform (in digital domain) can be expressed as:

$$x[m,n] = (-1)^{()}\exp\left(-j\pi u^{(m)}\frac{(n+1+2q^{(m)})n}{BT_c}\right) \quad (3)$$

where the exponential term of Equation 3 is a complex value that resembles the nth sample of a ZC sequence.

Additionally, if the transmit waveform is a phase-modulated FMCW waveform, then the transmit waveform becomes:

$$x[m,n] = x_{FMCW}[m,n]\exp\left(-j\pi\bar{u}\frac{(m+1+2\bar{q})m}{N}\right) \quad (4)$$

where $x_{FMCW}$ is the FMCW waveform, e.g., x[m, n] in Equation 3, $\bar{u}$ and $\bar{q}$ are parameters for a ZC sequence representation of a phase signal and N is the maximum prime value less than or equal to the total number of chirps $N_c$. Accordingly, a codeword may comprise the set of parameters: $\{u, q, \bar{u}, \bar{q}, N\}$. The transmit waveform can be considered a two-dimensional ZC sequence formed by modulating a first ZC sequence corresponding to the FMCW waveform with a second ZC sequence corresponding to the phase signal.

The parameters selected in step 510 are varied from chirp to chirp. In particular, the transmit waveform may be generating according to Equation 4 above, with at least one parameter being varied from chirp to chirp. For example, the values of u, q, $\bar{u}$, $\bar{q}$ can be set according to a codeword from codebook 300 in FIG. 3, where at least one of u, q, $\bar{u}$, or $\bar{q}$ is different between any two consecutive chirps. In certain embodiments, parameters are selected for multiple chirps at the same time (possibly for an entire chirp sequence) to determine the parameters in advance of generating the chirps. In other embodiments, parameters may be selected "on-the-fly" for each chirp. As an alternative to using a codebook, parameters can be varied randomly. For example, a new slope or a new frequency offset could be chosen randomly for each subsequent chirp. However, an advantage of using a codebook is that the parameters can be specifically chosen to ensure low mutual interference between codewords.

At step 512, the transmit waveform is generated according to the parameters selection in step 510.

At step 514, a waveform is received by the radar system and sampled (e.g., by an analog-to-digital converter of the receiver unit 430) to generate input to a first DFT algorithm (e.g., a fast-time DFT). The sampling may be performed at a sampling rate corresponding to a rate of change in one of the chirps (e.g., a sampling rate of $1/\beta^{(1)}$ (where $\beta^{(1)}$ is the slope of the first chirp in the chirp sequence). In certain embodiments, the same sampling rate is applied for every chirp in the chirp sequence.

The first DFT is applied to every chirp of the chirp sequence individually to generate for each chirp a corresponding representation of the chirp in the delay domain. When the transmit waveform x(t) is reflected back to the receiver, the corresponding received signal can be expressed in the time domain as:

$$y(t) \approx x(t)\underbrace{\exp(-j\pi(\beta t_0 - f_0)t_0)}_{K_\phi}\exp\left(j2\pi\frac{v}{\lambda}t\right)\exp(j2\pi\beta t_0 t) \quad (5)$$

where v is the relative speed of the reflecting object and $\lambda$ is the wavelength of the carrier signal. The $$\frac{v}{\lambda}$$

exponential term corresponds to the Doppler shift and the $\beta t_0$ exponential term corresponds to the time delay (which is indicative of distance). In Equation 5, the time value t in the digital domain can be expressed as:

$$t = \left(mT_c + \frac{n}{B}\right) \quad (6)$$

In the digital domain, the receive waveform y(t) can be expressed as:

$$y[m, n] \approx x[m, n]K_\phi \exp\left(j2\pi\left(\frac{v}{\lambda}T_c N_c\right)\frac{m}{N_c}\right)\exp\left(j2\pi(\beta T_c t_0)\frac{n}{BT_c}\right) \quad (7)$$

where $K_\phi$ is a phase factor corresponding to the first exponential term from Equation 5. The approximation in Equation 7 is based on an assumption that any phase shifts within a given chirp due to the Doppler effect are negligible.

In certain embodiments, upon receiving the receive waveform, the receiver unit multiplies the receive waveform by the conjugate of a previous (e.g., last used) transmit waveform:

$$r[m, n] = \quad (8)$$
$$y[m, n]x^*[m, n] = K_\phi \exp\left(j2\pi\left(\frac{v}{\lambda}T_c N_c\right)\frac{m}{N_c}\right)\exp\left(j2\pi(\beta T_c t_0)\frac{n}{BT_c}\right)$$

Since the receiver unit is part of the radar system, the receiver unit has access to information about the previous transmit waveform. For example, as discussed earlier, receiver unit 430 may have access to codewords previously selected by Tx waveform selection logic 412. The multiplication can be performed in either the analog domain or, as shown in Equation 8, the digital domain, and has the effect of canceling out the x(t) or x[m, n] term so that only the exponential terms from Equation 5 or Equation 7 remain. While not strictly necessary, this additional step operates to simplify receiver processing. For example, the multiplication be performed prior to sampling the receive waveform in order to enable a lower sampling rate.

Figure 6:
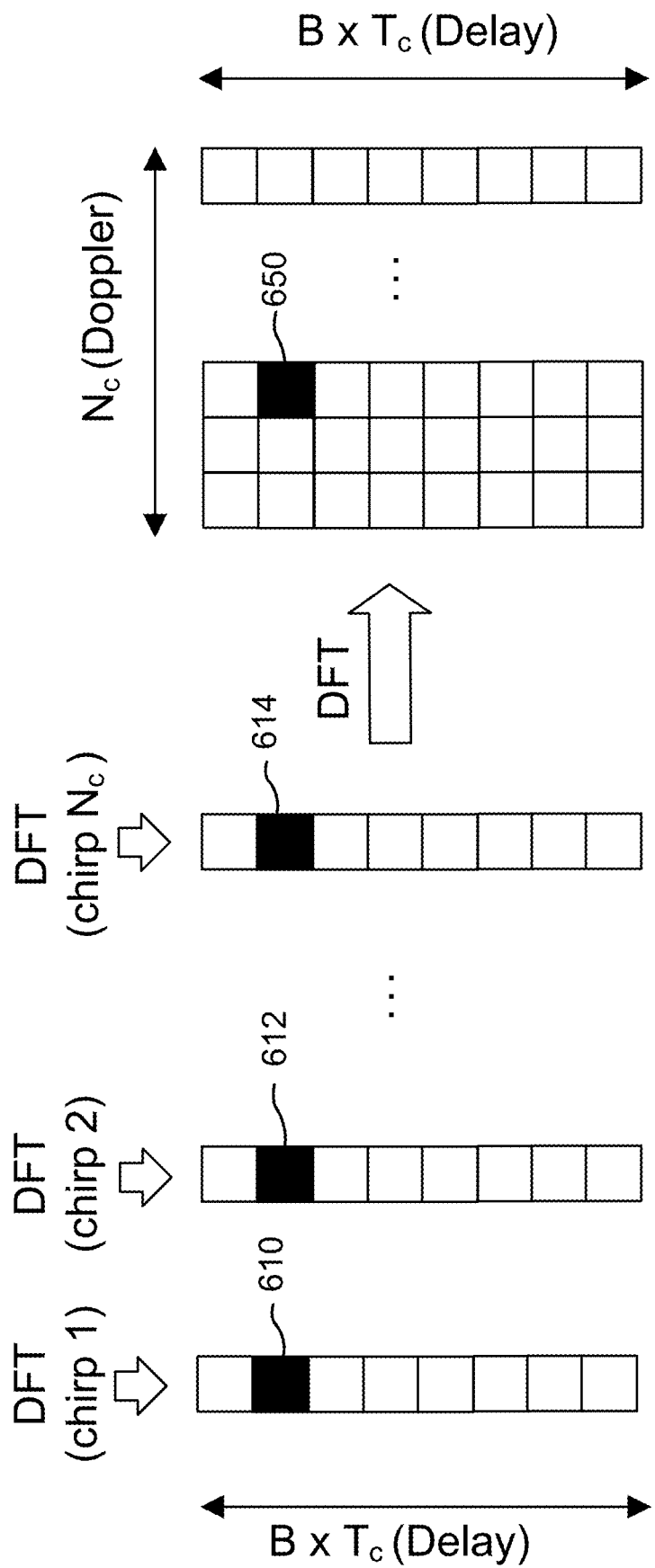
FIG. 6 is a graphical representation of a process for applying a two-dimensional Discrete Fourier Transform (DFT) to a receive waveform, in accordance with certain embodiments.

FIG. 6 is a graphical representation of a process for applying a two-dimensional DFT to a receive waveform in accordance with certain embodiments. As depicted in FIG. 6, a first DFT (e.g., the DFT in step 514) is applied to each chirp in a sequence of $N_c$ chirps to produce amplitude values, which are grouped into bins in the delay domain. As mentioned earlier, amplitudes above a certain threshold may be considered peaks. In FIG. 6, the peaks (610, 612, and 614) are represented as dark colored bins. The results of the first DFT are then combined by applying a second DFT (e.g., the DFT in step 518 discussed below) that produces a two-dimensional array of bins in the Doppler-delay domain. Peaks in the same bin location (i.e., the same delay index) in the output of the first DFT (e.g., peaks 610, 612, and 614) will add coherently to produce a peak (e.g., peak 650) in the output of the second DFT.

The process depicted in FIG. 6 works well so long as the waveform parameters are the same from chirp to chirp. However, when the waveform parameters are varied, the peaks in the output of the first DFT can shift to a different location so that the peaks fail to add coherently after applying the second DFT. This is because β is varied in order to adjust the slope, and the phase factor $K_\phi$ is a function of β and the frequency offset $f_0$.

Figure 7:
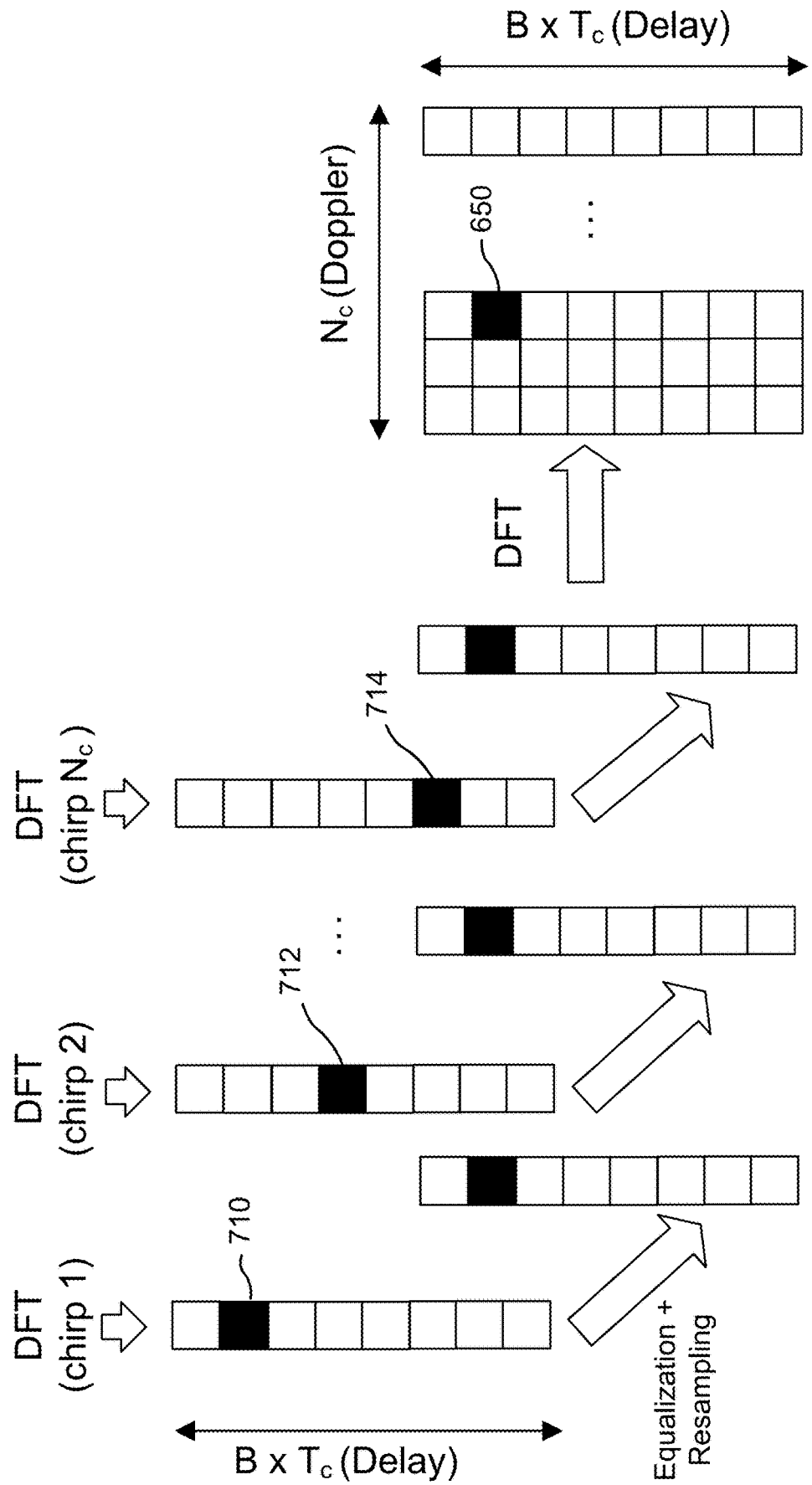
FIG. 7 is a graphical representation of a process for applying a two-dimensional DFT to a receive waveform after performing equalization and resampling, in accordance with certain embodiments.

Accordingly, equalization and resampling can be applied at step 516 of FIG. 5 to correct for the effects of varying parameters, as depicted in FIG. 7.

FIG. 7 is a graphical representation of a process for applying a two-dimensional DFT to a receive waveform after performing equalization and resampling in accordance with certain embodiments. As shown in FIG. 7, the location of peak 710 is the same as peak 610 in FIG. 6 because peak 710 is produced by applying a DFT to the first chirp, which was output prior to varying any parameters. Once the waveform parameters start to vary (e.g., for the second chirp and every chirp thereafter in the sequence of $N_c$ chirps), the peak locations (e.g., peaks 712 and 714) shift to a different location and with a different phase compared to their respective peaks in FIG. 6 (e.g., peaks 612 and 614). Equalization and resampling correct for shifts in phase and location, respectively.

Equalization and resampling can be performed concurrently upon the outputs of the first DFT. In certain embodiments, equalization is applied first, followed by resampling. The output of the first DFT can be expressed as:

$$R_{1D}^{(m)}[l] = \quad (9)$$

-continued $$\frac{\exp(-j\pi(\beta^{(m)}t_0 - f_0^{(m)})t_0)}{K_\phi^{(m)}}\exp\left(j2\pi\left(\frac{v}{\lambda}T_cN_c\right)\frac{m}{N_c}\right)\sqrt{BT_c}\,\delta(l - \beta^{(m)}T_ct_0)$$

where l is a delay index to a particular bin, $t_0$ is an unknown time delay with the to value of one of the chirps corresponding to the actual time delay of a target, and δ is the well-known delta function. Equalization takes into account phase variation and can be performed by multiplying $R_{1D}^{(m)}$ [l] with the following equalization function, which has the effect of canceling out the $K_\phi^{(m)}$ term (the first exponential) in Equation 9:

$$W^{(m)}[l] = \exp\left(j\pi\left(\beta^{(m)}\frac{l}{\beta^{(m)}T_c} - f_0^{(m)}\right)\frac{l}{\beta^{(m)}T_c}\right) \quad (10)$$

The equalization function $W^{(m)}[l]$ equalizes for every to that can be resolved to a corresponding delay index (e.g., l=0, 1, 2, etc.). Therefore, each bin is affected regardless of whether the bin contains a peak. However, this does not affect the ability to detect peaks since non-peak locations essentially contain noise that gets rotated by the equalization function without changing the noise statistics.

Resampling corrects for variations in the delta term in Equation 9. In the absence of resampling, the location of each peak in the output of the first DFT will depend on the slope of that particular chirp. Resampling takes into account slope changes. For example, if the slope of the first chirp is $\beta^{(1)}$ and the slope of the second chirp is twice that of the first chirp, i.e., $\beta^{(2)}=2\beta^{(1)}$, then the DFT outputs can be resampled by discarding every other sample (e.g., every even sample or every odd sample). As another example, if the slope of the second chirp is negative, e.g., $\beta^{(2)}=-\beta^{(1)}$, then the samples can be rotated by switching the values of the first sample with the last sample, the second sample with the second to last sample, etc. In this manner, sampling can be performed based on the slope $\beta^{(1)}$ of the first chirp so that the delay indexes become aligned for every chirp. Although the examples just discussed used the slope of the first chirp, resampling can be performed using any slope as a reference or common slope. For example, the common slope could be the minimum slope of the transmit waveform.

Returning to FIG. 5, at step 518 a second DFT (e.g., a slow-time DFT) is applied to the outputs of the first DFT after performing equalization and resampling in step 516. As mentioned earlier in connection with FIG. 6, the second DFT produces a two-dimensional array of bins in the Doppler-delay domain. The location of a peak in this two-dimensional array can be used to calculate the speed and distance of a target. The receive waveform can be expressed in the Doppler-delay domain as follows:

$$R[k, l] = K_\phi\sqrt{BT_cN_c}\,\delta\left(k - \frac{v}{\lambda}T_cN_c, l - \beta T_ct_0\right) \quad (11)$$

where k and l are Doppler and delay indexes, respectively, to a bin location in the two-dimensional array and β is the common slope to which the outputs of the first DFT were resampled in step 516.

At step 520, one or more attributes may optionally be calculated from the received signal (the waveform received in step 514). These attributes could be in addition to the distance and Doppler values calculated in step 524 below. For instance, in some embodiments, the position of the target relative to the receiver/radar source can be detected in two-dimensional or three-dimensional space by measuring the azimuth angle of the target and/or the elevation angle of the target, as observed from the perspective of the receiver. Together, azimuth angle and elevation angle indicate the direction of arrival (also known as angle of arrival) of the target.

Azimuth angle and elevation angle can be calculated using DFT based processing. The ability to calculate azimuth and elevation angles would depend on the antenna configuration of the receiver (e.g., whether the antennas are configured in a one-dimensional or two-dimensional array). For instance, if the receiver has an array of antennas arranged in the horizontal direction, a DFT could be performed across the receive antennas in the horizontal direction to calculate the azimuth angle. Similarly, a DFT could be performed across receive antennas in the vertical direction to calculate the elevation angle. Thus, the attributes of the target that are determined using the received signal can include distance, speed, azimuth angle, elevation angle, or any combination thereof.

Although step 520 is depicted as occurring after step 518, the additional attributes can be calculated at a different point in time, since the calculation of these additional attributes can be performed independently of the DFTs in steps 514 and 518. Thus, in another embodiment, step 520 could be performed before the first DFT in step 514.

At step 522, a peak is identified in the output of the second DFT. In some embodiments, the peak can be identified using a CFAR algorithm. The threshold for determining a peak can vary depending of the detection algorithm used. In a CFAR algorithm, the threshold is set according to a target false alarm probability. Ideally, the output of the second DFT comprises a separate peak for every real target, with no peaks corresponding to ghost targets. If there are multiple real targets, there may be multiple peaks in the output of the second DFT.

At step 524, distance and Doppler values are calculated based on the location of the peak identified in step 522. If the peak is identified as being located at index [l, k], the values of l and k can be applied to Equation 11 to calculate the following pair of values:

$$\left(\frac{c}{2\beta T_c}l, \frac{1}{N_cT_c}k\right) \quad (12)$$

The first value corresponds to the distance of a target from the radar source and can be calculated from the values of l, β, $T_c$, and c, where c is the speed of radio waves in the transmission medium (e.g., air). The second value corresponds to the speed of the target relative to the radar source and can be calculated from the values of k, $N_c$, and $T_c$. The radar system may then calculate the absolute speed of the target using the calculated relative speed of the target and the absolute speed of the radar source (e.g., as measured by a speedometer or other sensor of a vehicle in which the radar system 400 is installed).

Additionally, although described in reference to FMCW waveforms, the processing in FIG. 5 can be applied to other types of waveforms (e.g., PMCW). For example, a PMCW waveform can be represented as a ZC sequence, generated by varying one or more waveform parameters (e.g., slope or frequency offset), and further phase-modulated with a phase signal generated according to a phase code.

Figure 8A:
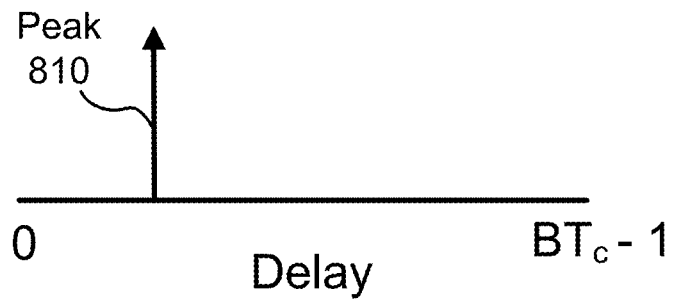
FIG. 8A illustrates a result of applying a first DFT to a single chirp in a received radar signal when the slope and the frequency offset of the received chirp match that of a transmitted chirp.

FIG. 8A illustrates a result of applying a first DFT to a single chirp in a received radar signal when the slope β and the frequency offset $f_0$ of the received chirp match that of a transmitted chirp. The result is depicted in the amplitude-delay domain instead of as discrete bins (e.g., as depicted in FIGS. 6 and 7). As shown in FIG. 8A, the output of the first DFT comprises an impulse corresponding to a peak 810 located at a particular delay index.

Figure 8B:
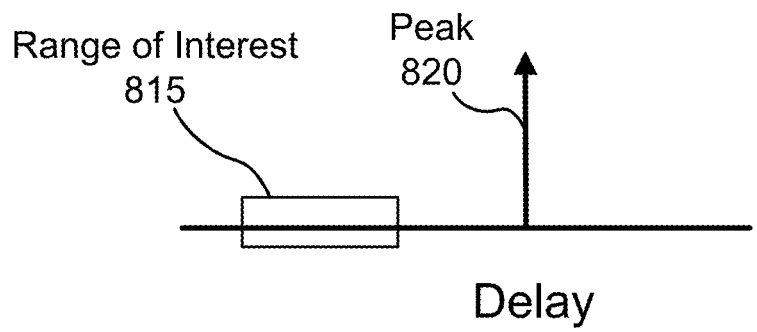
FIG. 8B illustrates a result of applying a first DFT to a single chirp in a received radar signal when the slope of the received chirp matches that of the transmitted chirp, but the frequency offsets are mismatched.

FIG. 8B illustrates a result of applying a first DFT to a single chirp in a received radar signal when the slope of the received chirp matches that of the transmitted chirp, but the frequency offsets are mismatched. As a result of the mismatched frequency offsets, the peak 820 is shifted compared to FIG. 8A. As depicted in FIG. 8B, the peak 820 may be shifted beyond a range of interest 815. The range of interest 815 is a range of delay indexes to which an actual target could plausibly correspond. The slope, frequency offset, and/or other parameters for each codeword in a codebook can be chosen such that when a radar source and an interference source are using codewords with different frequency offsets, any peaks attributed to the interference source are shifted beyond the range of interest.

Figure 8C:
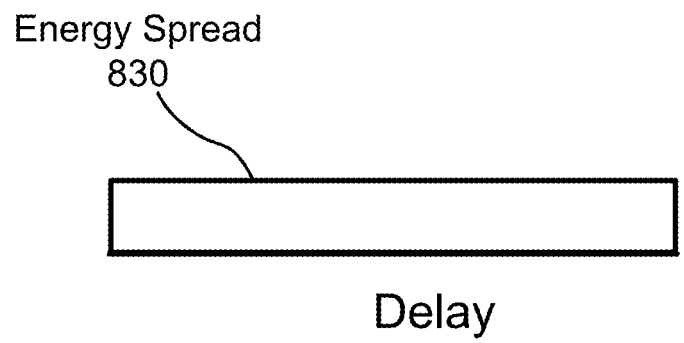
FIG. 8C illustrates a result of applying a first DFT to a single chirp in a received radar signal when the slope of the received chirp and the slope of the transmitted chirp are mismatched.

FIG. 8C illustrates a result of applying a first DFT to a single chirp in a received radar signal when the slope of the received chirp and the slope of the transmitted chirp are mismatched. The mismatched slopes result in an energy spread 830 over the entire delay domain.

Figure 9A:
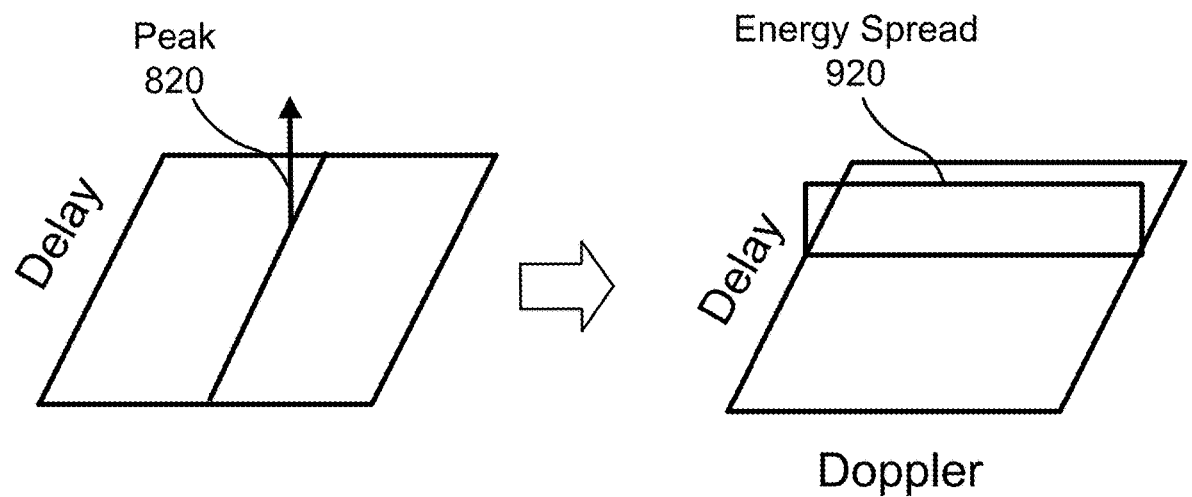
FIG. 9A illustrates a result of applying a second DFT to the outputs of a first DFT in a mismatched frequency offset and matched slope scenario.

FIG. 9A illustrates a result of applying a second DFT to the outputs of a first DFT in a mismatched frequency offset and matched slope scenario (e.g., the scenario in FIG. 8B). The outputs of the first DFT comprise amplitude values in the delay domain for multiple chirps of a received waveform and are transformed by the second DFT into amplitude values in the Doppler-delay domain (e.g., through the process depicted in FIG. 6). As a result of individual peaks in the output of the first DFT (e.g., peak 820 from FIG. 8B) being shifted, the output of the second DFT is distributed over the entire Doppler domain. The distribution produces an energy spread 920 located at the same offset in the delay domain. That is, the energy spread 920 is located at the same delay index as the delay index of the shifted peak 820. If additional peaks in the output of the first DFT are also shifted as a result of mismatched frequency offset, those additional peaks would be spread in a similar manner over the entire Doppler domain.

Figure 9B:
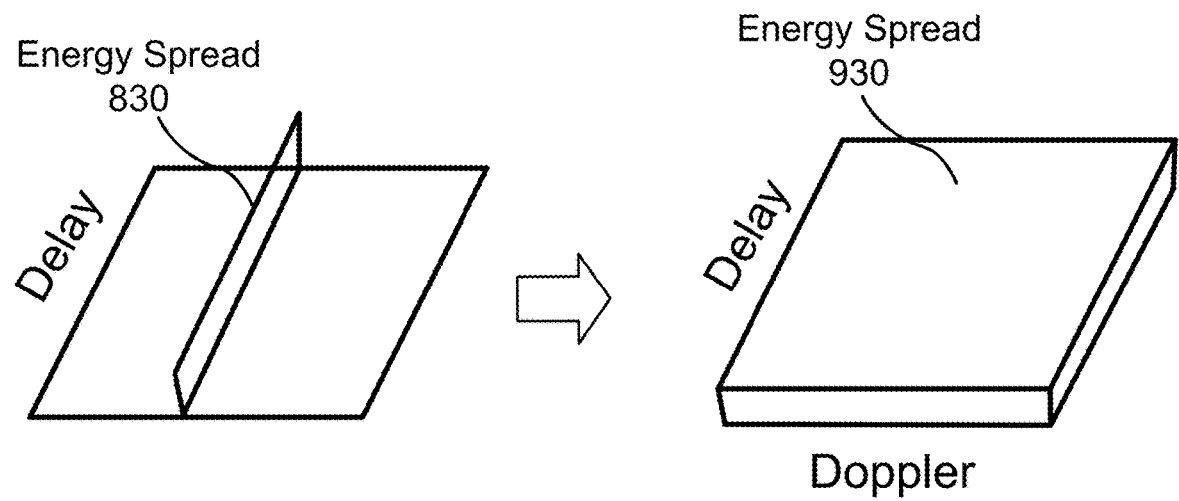
FIG. 9B illustrates a result of applying a second DFT to the outputs of a first DFT in a mismatched slope scenario.

FIG. 9B illustrates a result of applying a second DFT to the outputs of a first DFT in a mismatched slope scenario (e.g., the scenario in FIG. 8C). As a result of the energy spread in the output of the first DFT (e.g., energy spread 830 from FIG. 8C), the output of the second DFT is distributed over the Doppler-delay domain as an energy spread 930.

Based on FIGS. 9A and 9B, it is apparent that, as a result of applying the techniques described above, interference is suppressed when there is a slope mismatch, since the energy of the interference source is spread over the Doppler-delay domain such that no detectable peaks are formed for the interference source in the output of the second DFT. Further, interference is shaped when there is a frequency offset mismatch because, even though the energy of the interference source is not spread in the delay domain, any detected peaks would be located beyond a practical range of interest (e.g., range of interest 815 in FIG. 8B). Accordingly, if the peak is located at an implausible delay index or the distance computed based on the delay index is implausible, then the peak can be recognized as corresponding to an interference source rather than a real target.

The results depicted in FIGS. 9A and 9B can be achieved by choosing slope and frequency offset parameters such that the transmit waveform is represented as a ZC sequence. In particular, ZC sequences exhibit correlation properties that, in a mismatched slope scenario (ZC parameter u), give rise to constant cross-correlation for any delay and that, in a mismatched offset scenario (ZC parameter q), give rise to peaks located at a delay index that is shifted according to the mismatch in parameter q. Thus, ZC sequences have useful correlation properties for interference suppression and shaping in accordance with the techniques described herein. It should be noted however, that the transmit waveform need not have a perfect ZC form. Instead, an approximated ZC sequence may be sufficient for achieving the desired correlation properties mentioned above.

The examples discussed above focused on transmitter and receiver processing when the parameters of the transmit waveform are varied on a per chirp basis. The following discussion expands on the earlier examples and explains additional processing that could occur if an optional phase modulation were applied to the transmit waveform. Phase modulation is useful because the set of possible values for the slope and offset parameters (e.g., u and q) of the transmit waveform that minimize interference while meeting performance requirements may be limited. For example, the radar system may be designed to meet performance requirements with respect to the minimum distance between two targets that enables the targets to identified as separate objects (known as range resolution) and the minimum Doppler separation for two targets to be identified as separate objects (known as Doppler resolution). This limited set of values may be acceptable when only a small number of radar sources need to coexist (e.g., four radar sources, all within transmission range of each other), but not when coexistence of a greater number of radar sources is desired. For coexistence of a small set of radar sources, the size of the codebook (e.g., the number of codewords) can be kept small, and the codewords can be designed such that the fraction of chirps that produce unacceptable levels of mutual interference between any given pair of codewords is also relatively small. Coexistence of a greater number of users requires a larger codebook and, due to the limited number of usable parameter values, the fraction of chirps that produce unacceptable levels of mutual interference between any given pair of codewords is much larger. In particular, peaks attributed to an interference source may be observed in the output of the first DFT when the slope used by the interference source is the same as the slope used by the radar source and the frequency offset used by the interference source is also the same as the frequency offset used by the radar source.

Phase modulation can be applied to mitigate the problem of unwanted interference due to a limited set of usable parameter values. As mentioned earlier in connection with Equations 3 and 4, parameters can be chosen such that the transmit waveform and the phase-modulated transmit waveform can be represented as ZC sequences. Therefore, the waveform produced by applying phase modulation to a transmit waveform can be considered a two-dimensional ZC sequence. Varying the phase of the transmit waveform reduces the likelihood that peaks attributed to an interference source will add coherently when performing the second DFT.

In certain embodiments, the same phase modulation parameters can be applied for every chirp in a given chirp sequence. Alternatively, as with the base parameters for the transmit waveform, the parameters for the phase modulation can also be varied (e.g., randomly or according to a phase code). In certain embodiments, parameters are varied by changing at least one of the following with each chirp: the slope of the transmit waveform, the frequency offset of the transmit waveform, or the chirp phase. Further, as explained earlier in connection with FIG. 7, equalization can be performed to correct for the effects of varying slope and frequency offset. In particular, the equalization function in Equation 10 can be applied to correct for phase variation resulting from varying the slope and frequency offset. Likewise, phase variation resulting from applying phase modulation can be corrected for by applying an equalization function. Equalization for phase modulation can be performed concurrently with the equalization depicted in FIG. 7 (e.g., during step 516 of FIG. 5).

In certain embodiments, an initial chirp in a chirp sequence is formed with randomly chosen slope and offset parameters for the phase modulation (e.g., parameters u and q) as well as randomly chosen slope and offset parameters for the transmit waveform (e.g., parameters u and q). The initial chirp can, for example, be formed by randomly choosing any codeword in a codebook. For the next chirp and each chirp thereafter in the chirp sequence, the slope and offset parameters for the phase modulation can remain random, while the slope and offset parameters for the transmit waveform (e.g., parameters u and q) can be chosen to maximize a "distance" metric between the codeword of the next chirp and the codeword of the previous chirp. In one example, the distance metric is defined such that the distance is set to some maximum distance value so long as the slopes of the codewords are different, but set proportional to the difference in slope (e.g., the difference between the q values of the codewords) when the slopes are different. Similarly, the distance metric could be defined as a function of the difference in frequency offset or based on a combination of the difference in frequency offset and the difference in slope.

Figure 10A:
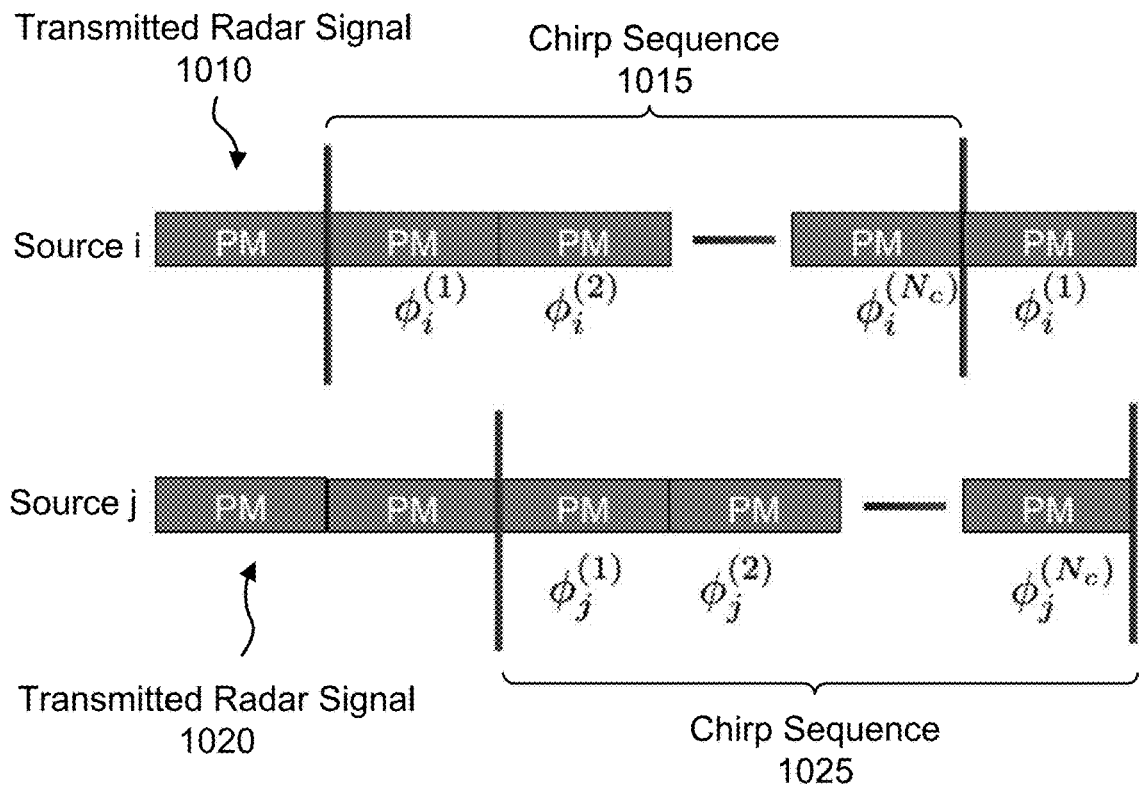
FIG. 10A illustrates an example of radar signals that are non-aligned with respect to time.

FIG. 10A illustrates an example of radar signals that are non-aligned with respect to time. In FIG. 10A, a first source "i" generates a radar signal 1010 comprising a chirp sequence 1015, and a second source "j" generates a radar signal 1020 comprising a chirp sequence 1025. Each of the chirp sequences 1015 and 1025 includes a total number of $N_c$ chirps. The radar signals 1010, 1020 are continuous signals in which the next sequence is transmitted immediately after the end of the current sequence. Each chirp is labeled "PM" to indicate that the chirp has been phase-modulated in accordance with the embodiments discussed above and has a corresponding phase $\phi$. The chirp sequences 1015 and 1025 are generated independently of each other such that they begin and end at different times.

Figure 10B:
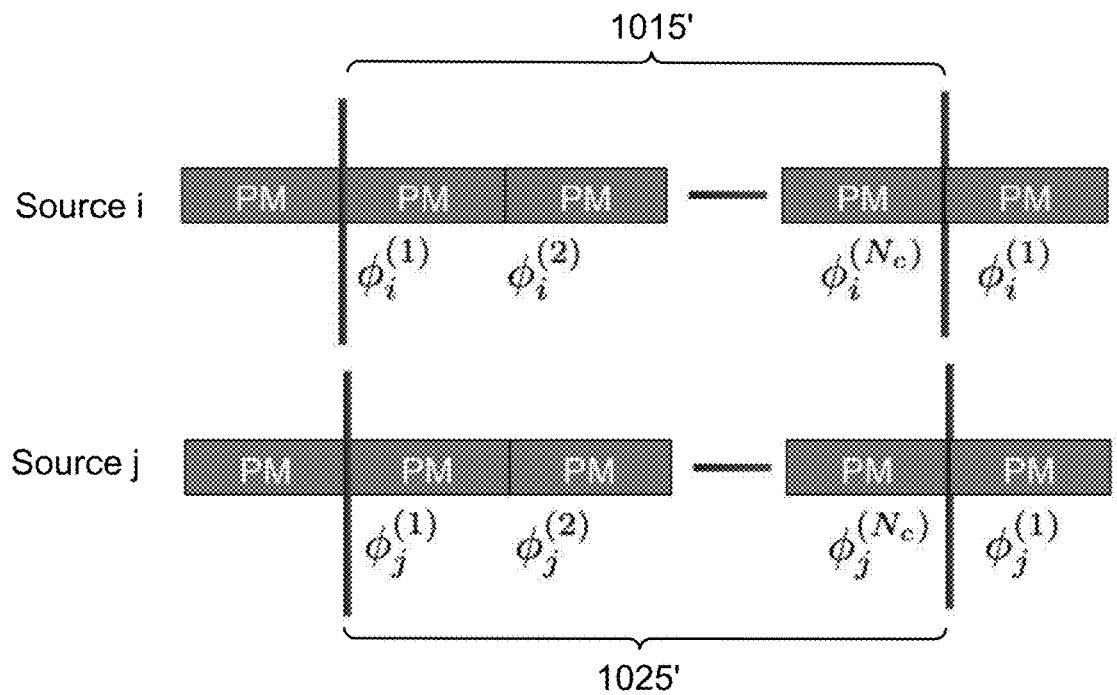
FIG. 10B illustrates an example of radar signals that are aligned with respect to time.

FIG. 10B illustrates an example of radar signals that are aligned with respect to time. In FIG. 10B, the chirp sequences 1015' and 1025' are aligned such that they begin and end at the same time. Alignment is useful because some phase-coded patterns in a codebook may not exhibit good correlation properties with delayed versions of other phase-coded patterns in the same codebook. For example, a codebook may be designed with a first codeword including a phase modulation component and a second codeword including a phase modulation component, where the first codeword and the second codeword have low mutual correlation when the corresponding transmit waveforms are time-aligned, but a high degree of mutual correlation when the transmit waveforms are misaligned in a particular way (e.g., whenever the first transmit waveform is delayed by three seconds relative to the second transmit waveform).

In certain embodiments, radar signals from different radar sources can be aligned based on a shared time reference, e.g., Coordinated Universal Time (UTC). For example each radar source may receive a UTC time from a Global Navigation Satellite System (GNSS) to determine when to transmit the next chirp. In this manner a synchronous "frame boundary" can be derived for each chirp sequence in order to align the chirp sequences of different radar sources.

Figure 11:
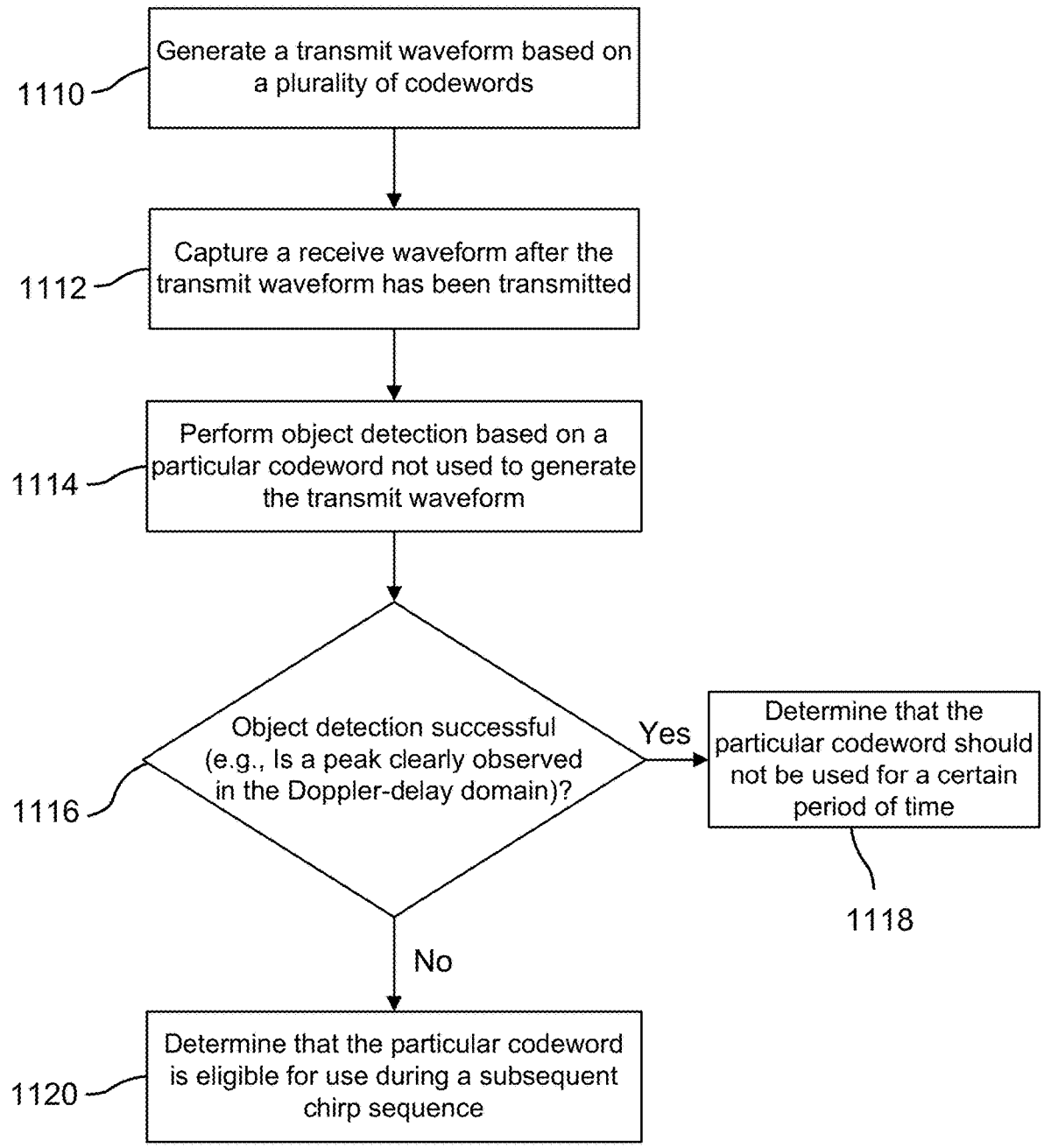
FIG. 11 is a simplified flowchart of a method for selecting codewords in accordance with certain embodiments.

FIG. 11 is a simplified flowchart of a method 1100 for selecting codewords in accordance with certain embodiments. The processing depicted in FIG. 11 can be performed by a radar system, e.g., the radar system 400 of FIG. 4. At step 1110, a transmit waveform is generated based on a plurality of codewords. For example, a different codeword could be selected for each chirp in a chirp sequence, each codeword comprising slope and offset parameters for a particular chirp in the chirp sequence, as well as slope and offset parameters for phase modulation applied to that particular chirp. The transmit waveform is than transmitted into the surrounding environment to be reflected off any objects that happen to be within transmission range of the radar system.

At step 1112, a receive waveform is captured after the transmit waveform generated in step 1110 has been transmitted. The receive waveform can be captured by a receiver unit of the radar system and may be captured as an analog, continuous-time signal. The receive waveform may be converted from the time domain to a digital domain, e.g., using an analog-to-digital converter to generate a digital representation of the receive waveform as a function of chirp number m and sample number n.

At step 1114, object detection is performed on the receive waveform based on a particular codeword not used to generate the transmit waveform (e.g., any codeword besides the codewords used to generate the chirp sequence of the transmit waveform). The object detection may include any of the receiver processes described earlier in connection with steps 514 to 518 of FIG. 5. In particular, the object detection may include applying a first DFT to each chirp of a chirp sequence in the receive waveform, followed by applying a second DFT to the outputs of the first DFT to generate a two-dimensional representation of the receive waveform in the Doppler-delay domain.

At step 1116, a determination is made whether the object detection in step 1114 was successful. In certain embodiments, this determination can be based on whether a peak is clearly observed in the Doppler-delay domain. For example, the receiver unit of the radar system may be configured to determine whether there are any bins for which the amplitude greatly exceeds the threshold for qualifying as a peak. If such a peak is identified, then the object detection is deemed successful and the method proceeds to step 1118. Otherwise, the method proceeds to step 1120.

At step 1118, a determination is made, in response to determining in step 1116 that the object detection was successful, that the particular codeword should not be used for a certain period of time (e.g., the next ten seconds). The successful object detection indicates that there is likely a nearby radar source that used the particular codeword for transmitting its own radar signal. Accordingly, the radar system can use other codewords, at least until the period of time has expired, in order to avoid potential interference between the signals transmitted by the nearby radar source and reflected signals derived from the radar system's own transmissions. This also benefits the nearby radar source since the radar system's subsequent transmissions will not interfere with reception of reflected signals by the nearby radar source.

At step 1120, a determination is made, in response to determining in step 1116 that the object detection was unsuccessful, that the particular codeword is eligible for use during a subsequent chirp sequence, e.g., the next chirp sequence. The subsequent chirp sequence can then be formed by selecting, for each chirp in the subsequent chirp sequence, a different codeword from a pool of eligible codewords.

In certain embodiments, steps 1114 to 1120 may be repeated for a plurality of codewords in a codebook in order to form the pool of eligible codewords for use in generating the subsequent chirp sequence. For example, the pool can be formed one codeword at a time by adding eligible codewords based on a negative determination in step 1116. As another example, the pool may initially include the entire set of codewords from a codebook, with the pool gradually becoming smaller as codewords are eliminated from consideration based on a positive determination in step 1116.

In certain embodiments, a codeword may be selected for use in generating a subsequent chirp based on a positive determination in step 1116. Such a codeword could be selected based on determining that the "distance" between the selected codeword and the particular codeword from step 1114 is greater than the distance between the particular codeword and other codewords in a codebook, where the distance is computed based on the distance metric discussed earlier. Thus, once an interfering codeword has been identified, codewords that are least likely to cause mutual interference with the interfering codeword can be chosen.

The condition of a single clearly observed peak in step 1116 is merely exemplary. Other conditions may be used for determining whether object detection is successful. For example, instead of a single clearly observed peak, the condition could be that there are at least three peaks above a certain amplitude threshold, all within a certain distance of each other (e.g., three peaks in a 4×4 neighborhood of bins).

Figure 12:
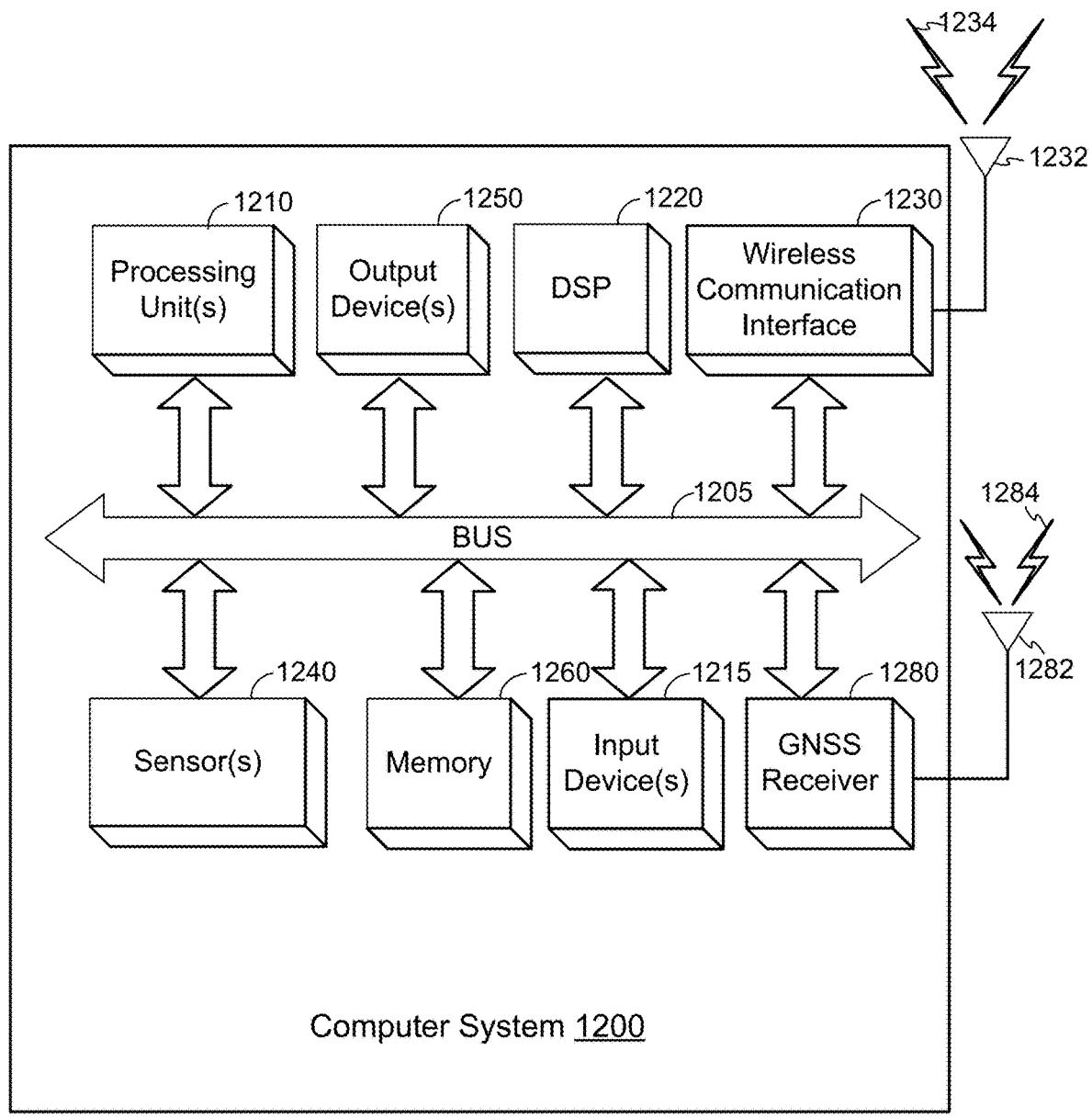
FIG. 12 illustrates an example computing system in which one or more embodiments may be implemented.

FIG. 12 illustrates an example computer system 1200 in which one or more embodiments may be implemented. Computer system 1200 may be utilized with and/or incorporate one or more electronic components of a radar system (e.g., radar system 400 of FIG. 4). In certain embodiments, computer system 1200 is deployed in a vehicle (e.g., vehicle 110 in FIG. 1). FIG. 12 provides a schematic illustration of one embodiment of a computer system that can perform the methods described herein, e.g., the methods described in connection with FIGS. 5 and 11. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

As depicted in FIG. 12, the computer system 1200 may comprise hardware elements that can be communicatively coupled via a bus 1205 (or other wired and/or wireless communication infrastructure, as appropriate). The hardware elements may include one or more processing units 1210, which can include without limitation one or more general-purpose processors, one or more special-purpose processors such as digital signal processor (DSP), graphics acceleration processors, application specific integrated circuits (ASICs), and/or the like. As shown in FIG. 12, some embodiments may have a separate DSP 1220. The processing unit(s) 1210 and/or DSP 1220 may perform radar processing including, for example, sending and receiving radar signals, applying DFTs, detecting interference from another radar source, and computing the distance and speed of an object based on a received radar signal.

The computer system 1200 may include one or more input devices 1215, which can include without limitation a touch screen, a keyboard, a touch pad, a camera, a microphone, and/or the like; and one or more output devices 1250, which can include without limitation a display device, speakers, and/or the like.

The computer system 1200 may further include a wireless communication interface 1230, which may include without limitation, a network card, an infrared communication device, a wireless communication device, and/or a chipset (such as a Bluetooth® device, an IEEE 802.11 device, or cellular communication facilities), and/or the like, which may enable the computer system 1200 to communicate with external computer systems or electronic devices. The communication can be carried out via one or more wireless communication antenna(s) 1232 that send and/or receive wireless signals 1234.

The computer system 1200 may further include sensor(s) 1240. Such sensors may comprise, without limitation, one or more instances of: a radar sensor (e.g., radar system 400 in FIG. 4), an inertial sensor (e.g., an accelerometer and/or a gyroscope), a camera, a magnetometer, an altimeter, a microphone, an ultrasonic sensor, a light sensor, and the like, some of which may be used to complement and/or facilitate the radar-related processing described herein.

The computer system 1200 may further include a GNSS receiver 1280 operable to receive signals 1284 from one or more GNSS satellites using an antenna 1282. The signals 1284 can be utilized to complement and/or incorporate the techniques described herein (e.g., to derive a shared time reference for aligning chirp sequences). In certain embodiments, the signals 1284 may be used to determine a geographical location of the computer system 1200, e.g., for use in vehicle navigation.

The computer system 1200 may further include and/or be in communication with a memory 1260. The memory 1260 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. In certain embodiments, memory 1260 may store a codebook comprising parameters for transmit waveforms.

The memory 1260 may comprise a non-transitory computer-readable medium storing instructions executable by one or more processors of computer system 1200 (e.g., processing units 1210). Such instructions may be stored as program code, e.g., an operating system, device drivers, executable libraries, or other application programs. The instructions stored in memory 1260 may be configured to cause the processor(s) to perform the radar-related processing described herein. Merely by way of example, one or more procedures described with respect to the method 500 of FIG. 5 discussed above may be implemented as code and/or instructions executable by processing units(s) 1210 and/or DSP 1220. In an aspect, then, such code and/or instructions can be used to configure and/or adapt a general purpose computer (or other computing device) to perform one or more operations in accordance with the techniques described herein.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided above, various machine-readable media might be involved in providing instructions/code to processing units and/or other device(s) for execution. Additionally or alternatively, the machine-readable media might be used to store and/or carry such instructions/code. In certain implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. Features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

The previous description is provided to enable a person skilled in the art to make or use the disclosed embodiments. Various modifications to these embodiments will be readily apparent to those skilled in the art, and the techniques described herein may be applied to other embodiments without departing from the scope of the disclosure. Thus, the present disclosure is to be accorded the widest scope possible consistent with the principles and novel features as defined by the following claims.

What is claimed is:

1. A method, comprising:
    generating, by a radar system, a frequency-modulated signal comprising a first chirp sequence, wherein each chirp in the first chirp sequence is generated according to a set of waveform parameters;
    varying, by the radar system, at least one waveform parameter in the set of waveform parameters for one or more chirps in the first chirp sequence;
    generating a phase signal according to a set of phase modulation parameters, wherein the set of phase modulation parameters includes a first parameter representing a slope of the phase signal and a second parameter representing a frequency offset of the phase signal;
    generating, by the radar system, a transmit signal by phase-modulating the frequency-modulated signal using the phase signal such that each chirp in the first chirp sequence has a corresponding phase determined according to the phase signal;
    changing the phase signal by varying at least one phase modulation parameter of the set of phase modulation parameters for at least one chirp in the first chirp sequence;
    receiving, by the radar system, a receive signal comprising a second chirp sequence, the receive signal corresponding to the transmit signal reflected off an object in a surrounding environment, wherein the receiving comprises sampling the receive signal; and
    determining, by the radar system using the sampled receive signal, one or more attributes of the object.

2. The method of claim 1, wherein the varying of the at least one waveform parameter comprises changing a slope of the one or more chirps, a frequency offset of the one or more chirps, or both.

3. The method of claim 1, wherein the determining of the one or more attributes of the object comprises:
    performing a first Discrete Fourier Transform (DFT) using the sampled receive signal, wherein the first DFT is applied to each chirp in the second chirp sequence individually to generate a separate result for each chirp in the second chirp sequence;
    performing a second DFT using the results of the first DFT; and
    detecting, by the radar system, a distance and a speed of the object based on a result of the second DFT.

4. The method of claim 3, further comprising:
    performing equalization on the results of the first DFT prior to performing the second DFT, wherein the varying of the at least one waveform parameter comprises changing a frequency offset of the one or more chirps, and wherein performing the equalization comprises determining, based on the frequency offset of the one or more chirps, an equalization function that is configured to correct phase shifts caused by changing the frequency offset of the one or more chirps.

5. The method of claim 3, further comprising:
    performing resampling on the results of the first DFT prior to performing the second DFT, wherein the varying of the at least one waveform parameter comprises changing a slope of the one or more chirps, and wherein performing the resampling comprises determining, based on the slope of the one or more chirps, a resampling rate that is configured to correct shifts in locations of peaks in the results of the first DFT caused by changing the slope of the one or more chirps.

6. The method of claim 1, wherein the at least one waveform parameter is varied with each consecutive chirp in the first chirp sequence.

7. The method of claim 1, wherein the set of waveform parameters is determined based on a first codeword from a plurality of codewords in a codebook, and wherein the varying of the at least one waveform parameter comprises switching to a second codeword from the plurality of codewords.

8. The method of claim 7, further comprising:
    performing object detection based on a third codeword not used for generating the first chirp sequence;
    determining, based on the object detection being successful, that there is an interference source in the surrounding environment; and
    responsive to the determination that there is an interference source, preventing the third codeword from being used for a subsequently transmitted chip sequence.

9. The method of claim 1, wherein the set of waveform parameters cause the transmit signal to be generated as a Zadoff-Chu sequence or approximation thereof.

10. A radar system, comprising:
one or more processors; and
memory storing instructions that, when executed by the one or more processors, cause the one or more processors to perform processing comprising:
generating a frequency-modulated signal comprising a first chirp sequence, wherein each chirp in the first chirp sequence is generated according to a set of waveform parameters;
varying at least one waveform parameter in the set of waveform parameters for one or more chirps in the first chirp sequence;
generating a phase signal according to a set of phase modulation parameters, wherein the set of phase modulation parameters includes a first parameter representing a slope of the phase signal and a second parameter representing a frequency offset of the phase signal;
generating a transmit signal by phase-modulating the frequency-modulated signal using the phase signal such that each chirp in the first chirp sequence has a corresponding phase determined according to the phase signal;
changing the phase signal by varying at least one phase modulation parameter of the set of phase modulation parameters for at least one chirp in the first chirp sequence;
receiving a receive signal comprising a second chirp sequence, the receive signal corresponding to the transmit signal reflected off an object in a surrounding environment, wherein the receiving comprises sampling the receive signal; and
determining, using the sampled receive signal, one or more attributes of the object.

11. The radar system of claim 10, wherein the varying of the at least one waveform parameter comprises changing a slope of the one or more chirps, a frequency offset of the one or more chirps, or both.

12. The radar system of claim 10, wherein the determining of the one or more attributes of the object comprises:
performing a first Discrete Fourier Transform (DFT) using the sampled receive signal, wherein the first DFT is applied to each chirp in the second chirp sequence individually to generate a separate result for each chirp in the second chirp sequence;
performing a second DFT using the results of the first DFT; and
detecting, by the radar system, a distance and a speed of the object based on a result of the second DFT.

13. The radar system of claim 10, wherein the set of waveform parameters is determined based on a first codeword from a plurality of codewords in a codebook, and wherein the varying of the at least one waveform parameter comprises switching to a second codeword from the plurality of codewords.

14. The radar system of claim 13, wherein the instructions further cause the one or more processors to perform processing comprising:
performing object detection based on a third codeword not used for generating the first chirp sequence;
determining, based on the object detection being successful, that there is an interference source in the surrounding environment; and
responsive to the determination that there is an interference source, preventing the third codeword from being used for a subsequently transmitted chip sequence.

15. The radar system of claim 10, wherein the instructions further cause the one or more processors to perform processing comprising:
performing a first Discrete Fourier Transform (DFT) using the sampled receive signal, wherein the first DFT is applied to each chirp in the second chirp sequence individually to generate a separate result for each chirp in the second chirp sequence;
performing a second DFT using the results of the first DFT;
performing equalization on the results of the first DFT prior to performing the second DFT, wherein the varying of the at least one waveform parameter comprises changing a frequency offset of the one or more chirps, and wherein performing the equalization comprises determining, based on the frequency offset of the one or more chirps, an equalization function that is configured to correct phase shifts caused by changing the frequency offset of the one or more chirps; and
detecting a distance and a speed of the object based on a result of the second DFT.

16. The radar system of claim 10, wherein the instructions further cause the one or more processors to perform processing comprising:
performing a first Discrete Fourier Transform (DFT) using the sampled receive signal, wherein the first DFT is applied to each chirp in the second chirp sequence individually to generate a separate result for each chirp in the second chirp sequence;
performing a second DFT using the results of the first DFT;
performing resampling on the results of the first DFT prior to performing the second DFT, wherein the varying of the at least one waveform parameter comprises changing a slope of the one or more chirps, and wherein performing the resampling comprises determining, based on the slope of the one or more chirps, a resampling rate that is configured to correct shifts in locations of peaks in the results of the first DFT caused by changing the slope of the one or more chirps; and
detecting a distance and a speed of the object based on a result of the second DFT.

17. The radar system of claim 10, wherein the instructions further cause the one or more processors to perform processing comprising:
determining the set of waveform parameters based on a first codeword from a plurality of codewords in a codebook, wherein the varying of the at least one waveform parameter comprises switching to a second codeword from the plurality of codewords;
performing object detection based on a third codeword not used for generating the first chirp sequence;
determining, based on the object detection being successful, that there is an interference source in the surrounding environment; and
responsive to the determination that there is an interference source, preventing the third codeword from being used for a subsequently transmitted chip sequence.

18. One or more non-transitory computer-readable media storing instructions that, when executed by one or more processors of a computer system, cause the one or more processors to:
generate a frequency-modulated signal comprising a first chirp sequence, wherein each chirp in the first chirp sequence is generated according to a set of waveform parameters;

vary at least one waveform parameter in the set of waveform parameters for one or more chirps in the first chirp sequence;

generate a phase signal according to a set of phase modulation parameters, wherein the set of phase modulation parameters includes a first parameter representing a slope of the phase signal and a second parameter representing a frequency offset of the phase signal;

generate a transmit signal by phase-modulating the frequency-modulated signal using the phase signal such that each chirp in the first chirp sequence has a corresponding phase determined according to the phase signal;

change the phase signal by varying at least one phase modulation parameter of the set of phase modulation parameters for at least one chirp in the first chirp sequence;

receive a receive signal comprising a second chirp sequence, the receive signal corresponding to the transmit signal reflected off an object in a surrounding environment, wherein the receiving comprises sampling the receive signal; and determine, using the sampled receive signal, one or more attributes of the object.

19. The non-transitory computer-readable media of claim 18, wherein the varying of the at least one waveform parameter comprises changing a slope of the one or more chirps, a frequency offset of the one or more chirps, or both.

* * * * *